US008605987B2

(12) United States Patent
Chao et al.

(10) Patent No.: US 8,605,987 B2
(45) Date of Patent: Dec. 10, 2013

(54) OBJECT-BASED 3-DIMENSIONAL STEREO INFORMATION GENERATION APPARATUS AND METHOD, AND INTERACTIVE SYSTEM USING THE SAME

(75) Inventors: Tzu-Yi Chao, HsinChu (TW); Hsin-Chia Chen, HsinChu (TW); Chuan-Hsin Lee, HsinChu (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 1166 days.

(21) Appl. No.: 11/879,114

(22) Filed: Jul. 16, 2007

(65) Prior Publication Data

US 2008/0044079 A1 Feb. 21, 2008

(30) Foreign Application Priority Data

Aug. 17, 2006 (TW) .............................. 95130315 A

(51) Int. Cl.
*G06K 9/00* (2006.01)
(52) U.S. Cl.
USPC ................ 382/154; 345/419; 348/42; 356/12
(58) Field of Classification Search
USPC .......................... 382/154, 285; 345/419–427; 356/12–14; 348/42–60
See application file for complete search history.

(56) References Cited

U.S. PATENT DOCUMENTS

| 6,278,798 B1 * | 8/2001 | Rao .............................. 382/154 |
| 6,690,451 B1 * | 2/2004 | Schubert ...................... 356/3.14 |
| 2005/0100192 A1 * | 5/2005 | Fujimura et al. .............. 382/103 |

FOREIGN PATENT DOCUMENTS

JP 2001-147117 5/2001

* cited by examiner

*Primary Examiner* — Aaron W Carter
(74) *Attorney, Agent, or Firm* — Tung & Associates

(57) ABSTRACT

The present invention relates to an object-based 3-dimensional stereo information generation apparatus and method, and an interactive system using the same. The method comprises: obtaining at least two 2-dimensional images with respect to the same space at a first time point; extracting objects from the at least two 2-dimensional images, respectively; establishing correspondences between objects; and generating 3-dimensional stereo information according to corresponding objects. The apparatus and interactive system comprises: at least two image capturing units for respectively capturing 2-dimensional images; and processing means for generating 3-dimensional stereo information according to the captured 2-dimensional images.

18 Claims, 14 Drawing Sheets

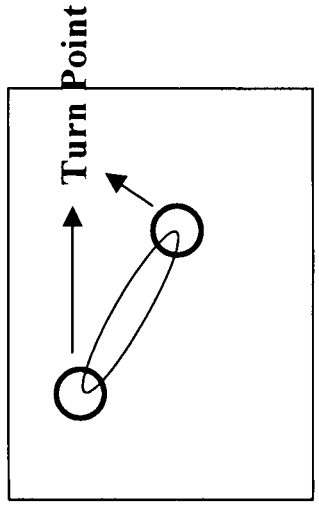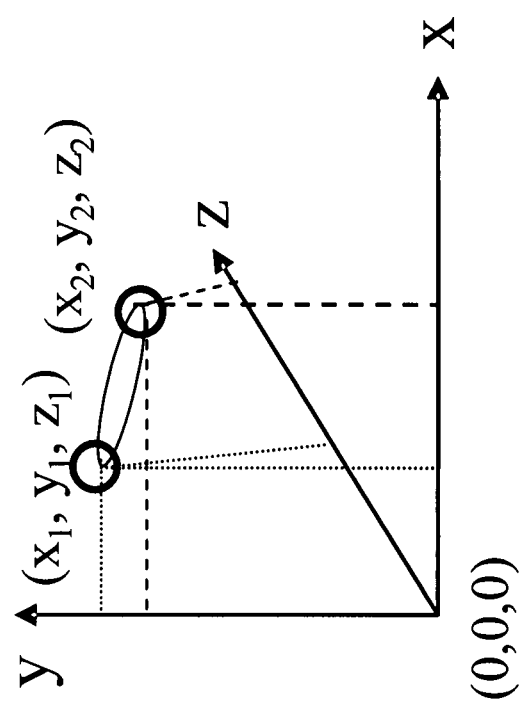
Fig. 4C

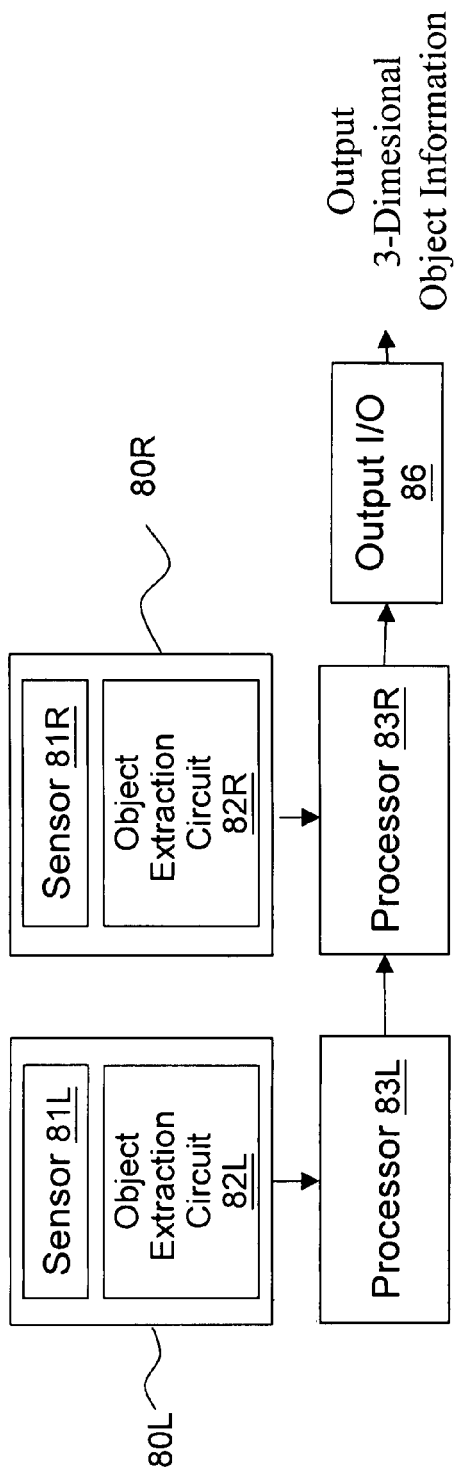
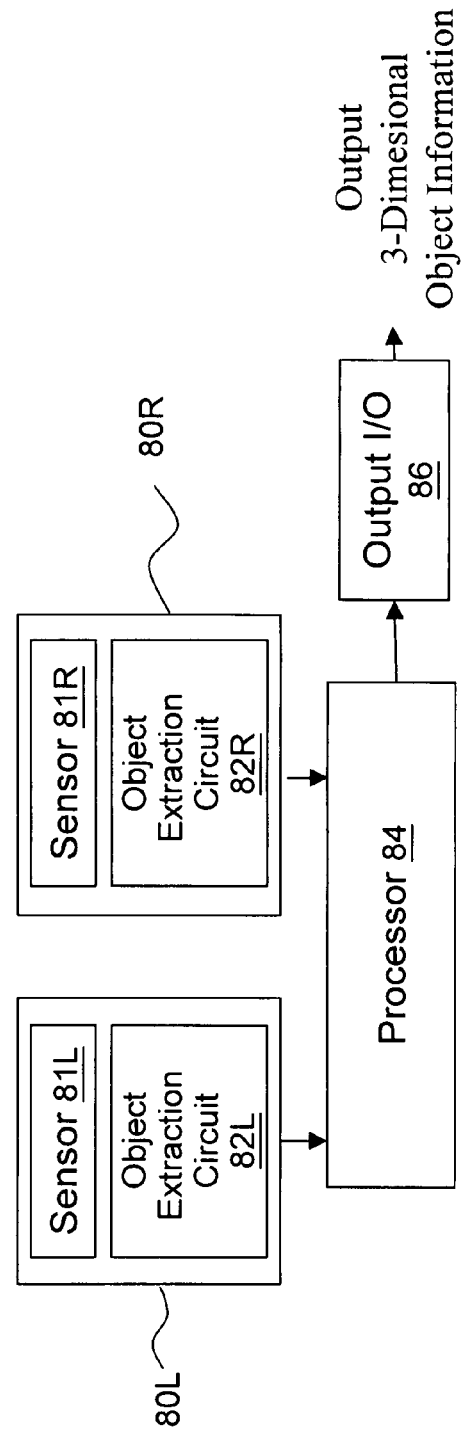

OBJECT-BASED 3-DIMENSIONAL STEREO INFORMATION GENERATION APPARATUS AND METHOD, AND INTERACTIVE SYSTEM USING THE SAME

FIELD OF THE INVENTION

The present invention relates to an object-based 3-dimensional (3D) stereo information generation apparatus and method, and an interactive system using the same.

BACKGROUND OF THE INVENTION

Interactive systems functioning in response to the actions of a user have been developed, such as video shooting games. In such shooting games, a user holds a pointing device (such as a rifle-like pointer) provided by the interactive system, and interacts (e.g., to move and shoot) with the plot displayed on a screen. The interactive system displays corresponding scenes, e.g., enemies shot, house explosion, etc. in response to the movement and other actions of the pointing device.

Although such interactive games provide great fun to users, they can not present true feeling "in the field" because they can only detect 2-dimensional (2D) movements of the hand-held pointing device; the "depth" dimension, i.e., movements in the forward and backward direction, can not be detected.

To improve this, U.S. Pat. No. 6,795,068 discloses a method which can decide the 3 D status of an object according to its 2D information. As shown in FIGS. 1A and 1B, the cited patent uses a physical object (such as a baseball bat) having strong contrast of colors. The object includes two parts 301 and 303 of different colors, for better identifying corresponding images. FIG. 1B shows the 2D image 305 captured by a camera or an image sensor, in which the 2D image 307 corresponds to the upper part 301 of the object. In the 2D image, all the information in the x-y coordinates are known; the information in the z coordinate is obtained by the ratio between the upper width w2 and the lower width w1, which determines the angle Φ. Because the object is allowed to move in every possible position in the real 3D space, its corresponding 2D image may vary in various ways; thus, to be precise, the positions to measure the width w2 and the width w1 can not be arbitrarily selected. According to the patent, it makes equidistant measurements of widths between the upper and lower ends of the objects, and averages them.

This cited patent has been commercialized successfully, but it has the following drawbacks. First, for the system to recognize the object, the shape of the object must be pre-defined; the user can not arbitrarily use any object. Second, the color contrast is critical for accurately capturing an image of the object; if the borderline between two parts of different colors is shielded for any reason, such by a hand or a part of the user's body, the resulted 3D information calculation may be incorrect. Third, the system needs to continuously calculate multiple widths, greatly increasing the loading of the processor in the system.

In view of the foregoing, the present invention proposes a different approach to generate 3D stereo information without the above-mentioned drawbacks. The term "to generate 3D stereo information" as used in the context of the present invention is not limited to generating a 3D image on a screen corresponding to the 3D information; it includes, e.g., presenting a corresponding response to the 3D information, such as presenting the flying path of a baseball affected by the swinging strength of a baseball bat, etc.

SUMMARY OF THE INVENTION

In view of the foregoing, it is a first objective of the present invention to provide an object-based 3D stereo information generation apparatus without the above-mentioned drawbacks.

A second objective of the present invention is to provide an object-based 3D stereo information generation method.

A third objective of the present invention is to provide an interactive system using the apparatus or method.

To achieve the foregoing objectives, and from one aspect of the present invention, an object-based 3D stereo information generation method comprises: obtaining at least two 2D images from the same area at a first time point; extracting information of a plurality of objects from the at least two 2D images; establishing a correspondence between at least two of the objects; and generating 3D information according to the at least two objects with correspondence.

In the abovementioned method, preferably, the objects extracted from the 2D images are marked, or, 3D objects in the generated 3D information are marked, to simplify calculation.

From another aspect of the present invention, an electronic apparatus for generating 3D stereo information comprises: at least two image capturing units for capturing analog images respectively, and transforming the analog images to digital 2D information, wherein the distance between the at least two image capturing units and the focal distance of each of the at least two image capturing units are known; object extraction circuit for receiving the digital 2D information and extracting object information thereof; and processor circuit for generating 3D information based on the object information, the distance between the at least two image capturing units and the focal distance of each of the at least two image capturing units.

Preferably, the abovementioned electronic apparatus further comprises a low bandwidth communication interface located between the processor circuit and the at least two image capturing units, or integrated in the processor circuit.

From yet another aspect of the present invention, an interactive system for generating 3D stereo information, comprising: at least two image capturing units for capturing analog images respectively, and transforming the analog images to digital 2D information, wherein the distance between the at least two image capturing units and the focal distance of each of the at least two image capturing units are known; object extraction circuit for receiving the digital 2D information and extracting object information thereof; processor circuit for generating 3D information based on the object information, the distance between the at least two image capturing units and the focal distance of each of the at least two image capturing units; and an output interface for outputting the 3D information.

Preferably, the abovementioned interactive system further comprises a light emission source, which is more preferably an infrared light emission source. The light emission source and the at least two image capturing units can be located at two sides of a space, or at the same side of a space. In the latter case, the interactive system further comprises a light-reflective block located at another side of the space.

Preferably, the abovementioned interactive system further comprises a low bandwidth communication interface located between the processor circuit and the at least two image capturing units, or integrated in the processor circuit.

For better understanding the objects, characteristics, and effects of the present invention, the present invention will be described below in detail by illustrative embodiments with reference to the attached drawings.

BRIEF DESCRIPTION OF THE DRAWINGS

FIGS. 4A-4C explain how to transform the 2D information of each group of corresponding objects to 3D information.

FIGS. 8A and 8B are schematic diagrams showing hardware circuit embodiments according to the present invention.

DETAILED DESCRIPTION OF THE PREFERRED EMBODIMENTS

The present invention is different from prior art in both hardware and method aspects. In the present invention, at least one light emission source and two sensors are provided; the sensors sense the light emitted from the light emission source, and the sensed result is transformed into 3D stereo information. The light emission source is preferably an infrared light source, such as an IR LED; correspondingly, the sensors should be IR sensors. But other kinds of light emission sources and sensors also fall in the scope of the present invention.

Figure 1B:
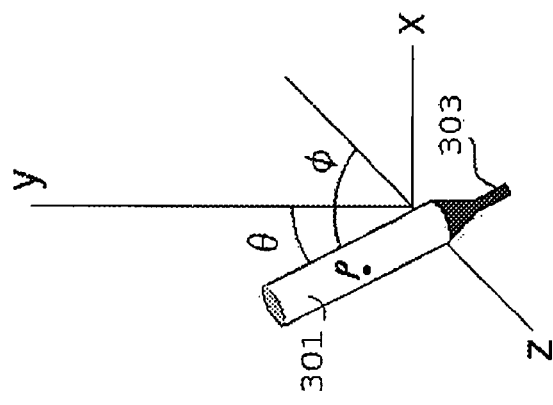
FIGS. 1A and 1B show how to decide the 3D status of an object according to its 2D information in a prior art patent.
Figure 1A:
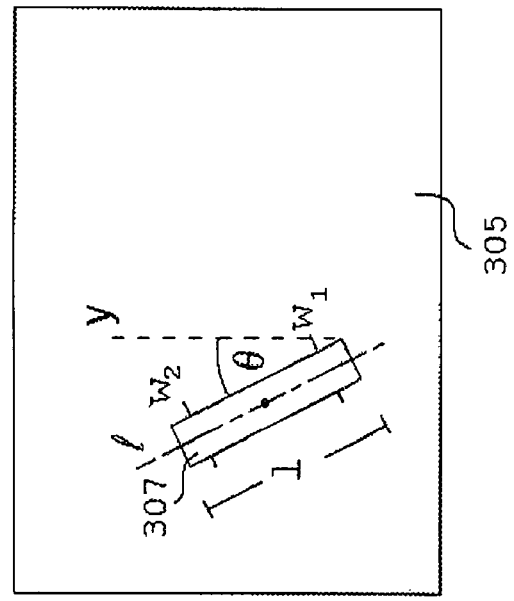
Figure 2:
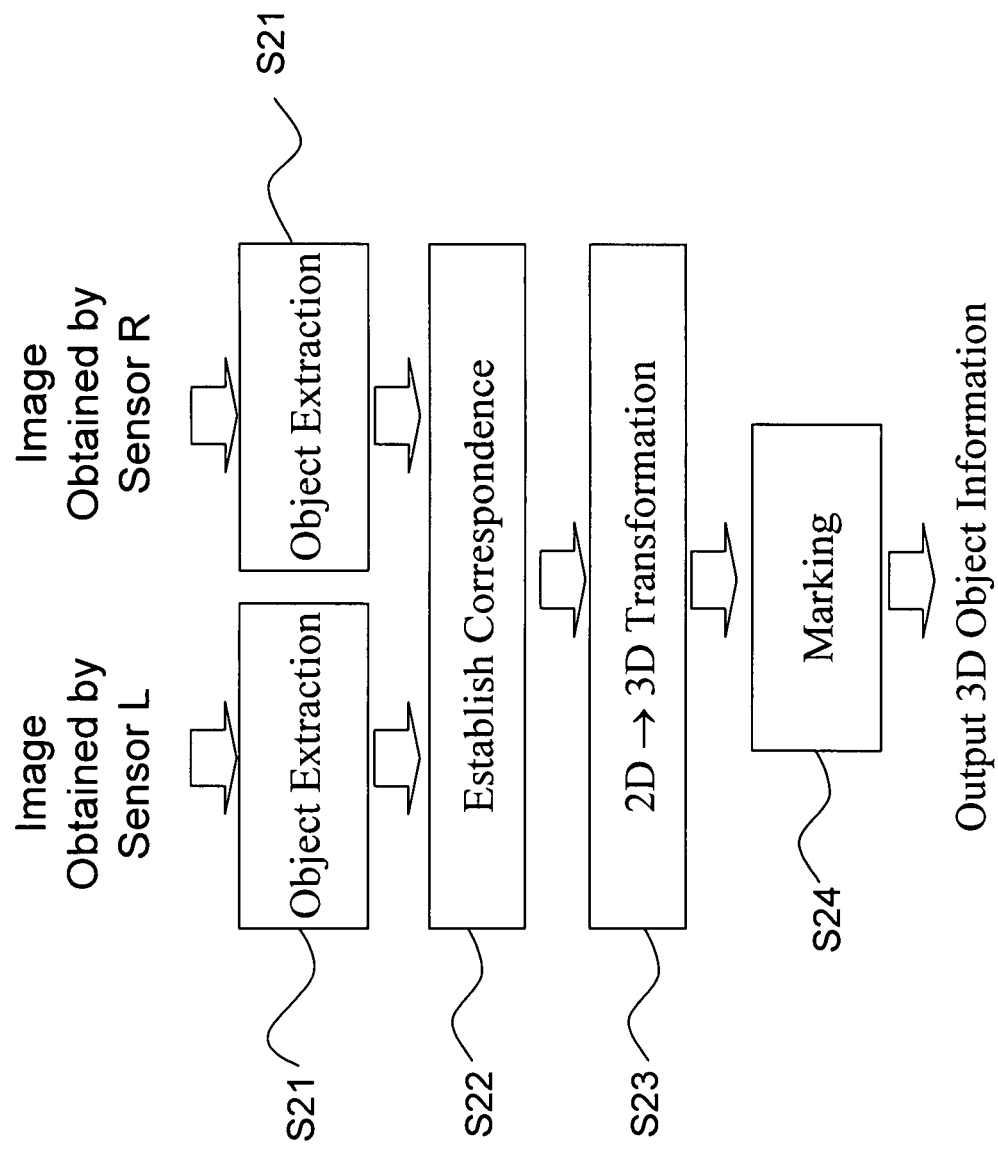
FIG. 2 shows a method embodiment according to the present invention.

The process flow of the method according to the present invention will now be described. FIG. 2 shows a method embodiment according to the present invention. As shown in the figure, assuming that two sensors (a left sensor L and a right sensor R) are used to observe the same area. The two sensors transfer the analog images they observe into digital 2D information. In fact, the "analog image" is many light spots which can be represented by brightness and color information, sensed by the sensors. These light spots may come from a light source, or may be reflected from a real physical object. The sensors transfer these light spots into digital 2D information, and the digital 2D information passes through a step of "object extraction" (step S21) wherein the 2D information is analyzed and summarized into several "objects".

A summarized "object" is not a physical object in the real world. In the present invention, an "object" means a group of pixels having a similar characteristic; it does not have to match with a physical object in the real world, nor even have to be connected. For example, an "object" may include an upper-left block and a lower-right block in a whole-screen image.

There are many ways to summarize 2D information into objects. For example, if a normal light emission source is used, the 2D information can be summarized according to color, shape, area, density of bright/dark spots within a given local area, brightness, texture (similar interrelationships among pixels), etc. In summarizing an image into objects, not all of the pixels of the 2D information have to be meaningful. For example, brightness smaller than a threshold can be simply deemed as background.

More preferably, according to the present invention, it even does not have to base its calculation on the whole object; instead, only a meaningful feature is required for calculation. For example, the 2D information can be binarized (that is, a number 0 or 1 is given to each pixel) according to a criterion, such as a brightness threshold, and the brighter part is defined as an object. Further, a feature of the object is defined and used as the basis for calculation, which can be, but is not limited to, the gravity, boundary, shape, size, aspect ratio, characteristic points (end points, corner points, high curvature points, etc.), and so on, of the object.

The definition of a feature from an object helps to simplify the complexity of calculation. U.S. Ser. No. 11/477,109 assigned to the same applicant as that of the present invention illustrates an example for transforming multiple data into a simple gravity vector, simplifying the following calculation.

Via the step S21, objects, or preferably features, can be identified from any 2D information. Hence, it is not required to predefine a shape of a physical object, nor does the physical object have to be provided with strong color contrast.

Figure 3:
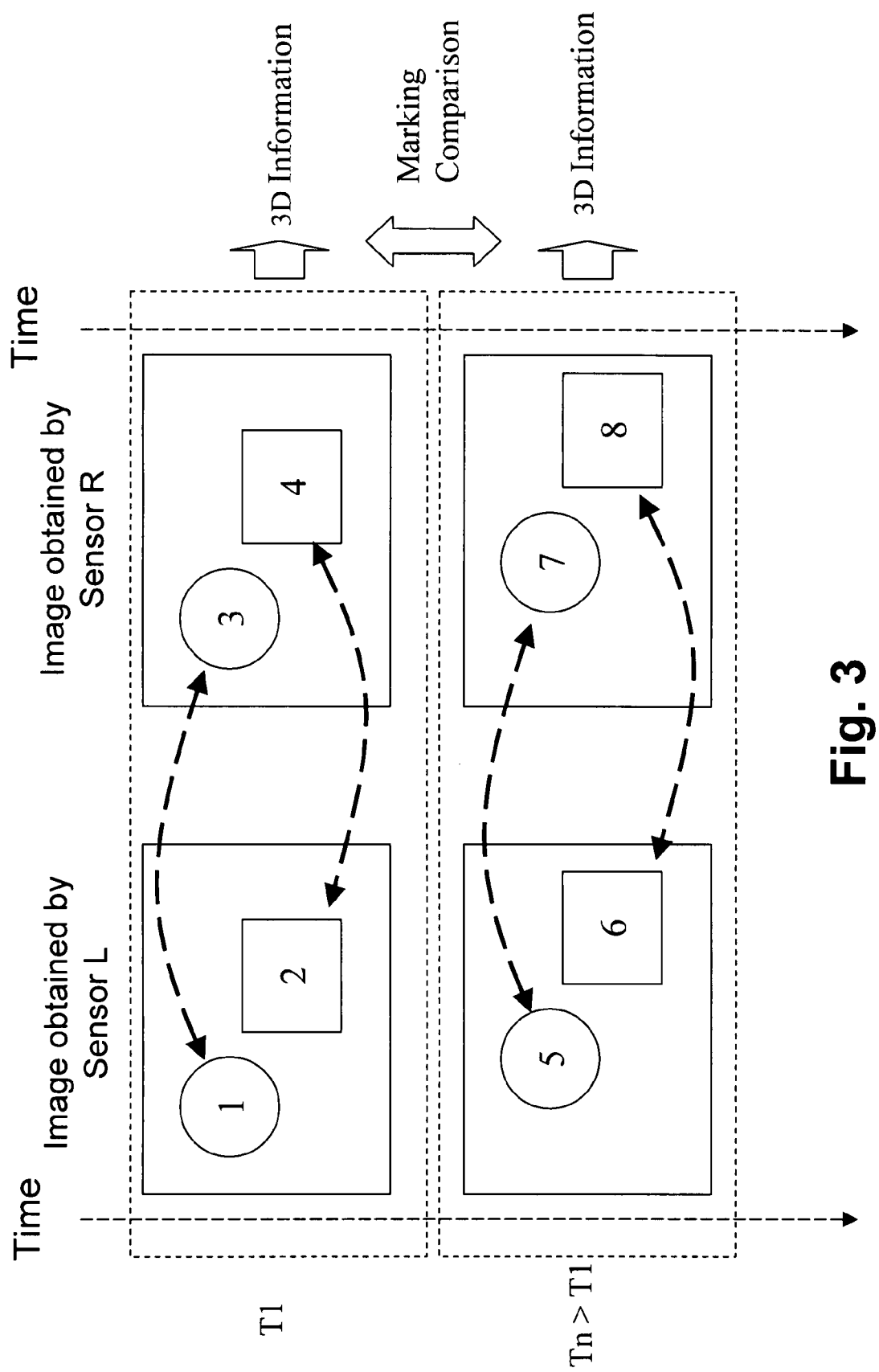
FIG. 3 shows an example for establishing correspondences between objects in time and space domains, after objects having been extracted.

After step S21 wherein objects are extracted from the 2D image information obtained by the left and right sensors, in step S22, a correspondence is established between the objects of the left and right images. Referring to FIG. 3, at the time point T1, objects 1 and 2 are extracted from the 2D image obtained by the left sensor, and objects 3 and 4 are extracted from the 2D image obtained by the right sensor. There are many ways to establish correspondences. For example, a correspondence can be built between two objects having closest gravity centers; two objects having largest overlapping areas; two objects having the same number of laterals (indefinite number of laterals for a circle); two objects having the most similar textures; objects meeting the same criterion, such as objects each having one hollow space inside its boundary, two hollow spaces inside its boundary, none hollow space inside its boundary, etc. In the embodiment shown in FIG. 3, a correspondence is built between the object 1 in the image obtained by the left sensor and the object 3 in the image obtained by the right sensor, and similarly, a correspondence is built between the object 2 in the image obtained by the left sensor and the object 4 in the image obtained by the right sensor.

After establishing the correspondence, in step S23, the 2D information of the objects is transformed into 3D information. As an example, the transformation can be done in a way shown in FIG. 4A, wherein the distance between the center positions of the left and right sensors is T; the focal distance of each of the sensors is f; the x coordinate of an object in the 2D information obtained by the left sensor is $x_1$, and its x coordinate in the 2D information obtained by the right sensor is $X_r$ (which is a negative value because it is located at the left side of the center position of the right sensor, if we define the center position of a sensor to be the original point); the distance between the object and the sensor plane is Z. According to the principle of similar triangles, $$x_1/f = X/Z, \text{ and } -x_r/f = (T-X)/Z$$

The 3D information of the object can be obtained as:

$$X = (T \times x_1)/(x_1 - x_r)$$

$$Y = (T \times y_1)/(x_1 - x_r)$$

(wherein $y_1$ is not shown in the figure)

$$Z = f \times [T/(x_1 - x_r)]$$

Thus, the 3D information of each point of the object can be obtained.

Figure 4A:
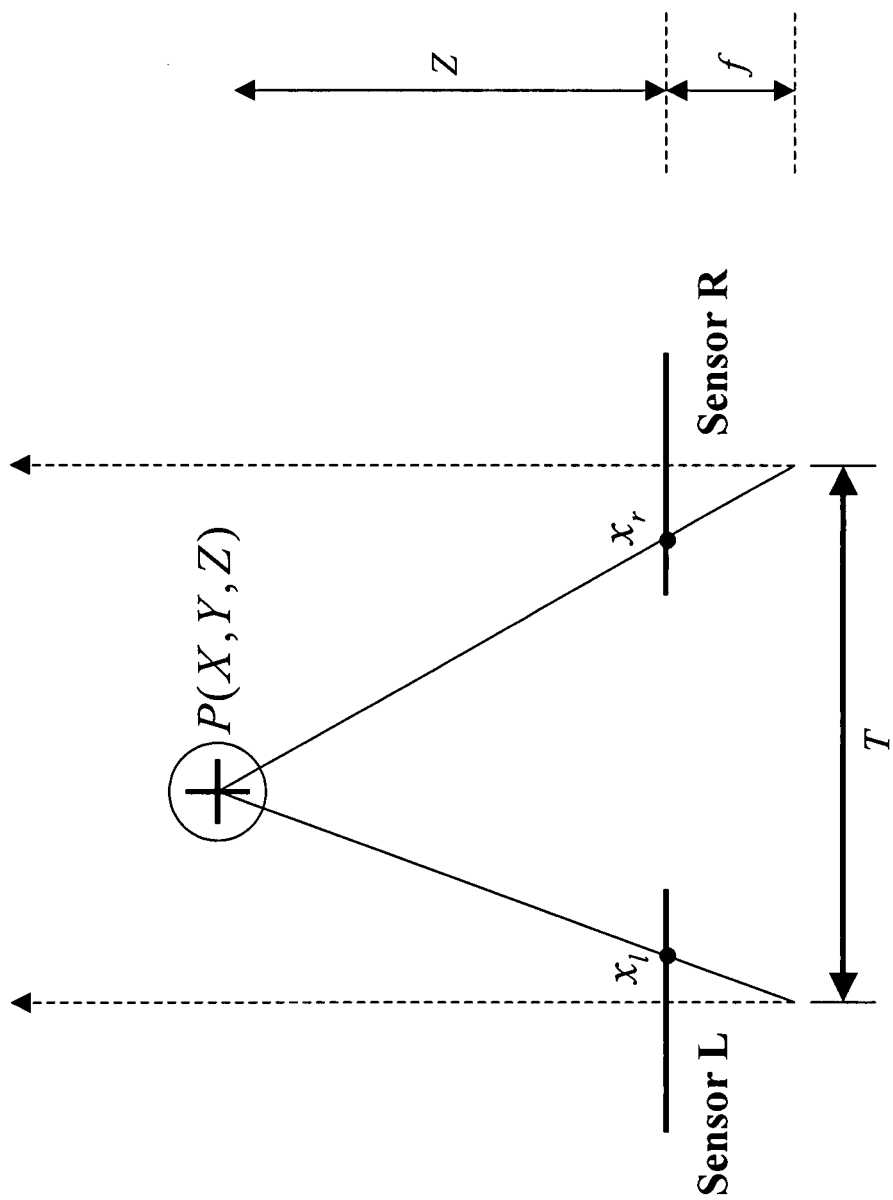
Figure 4B:
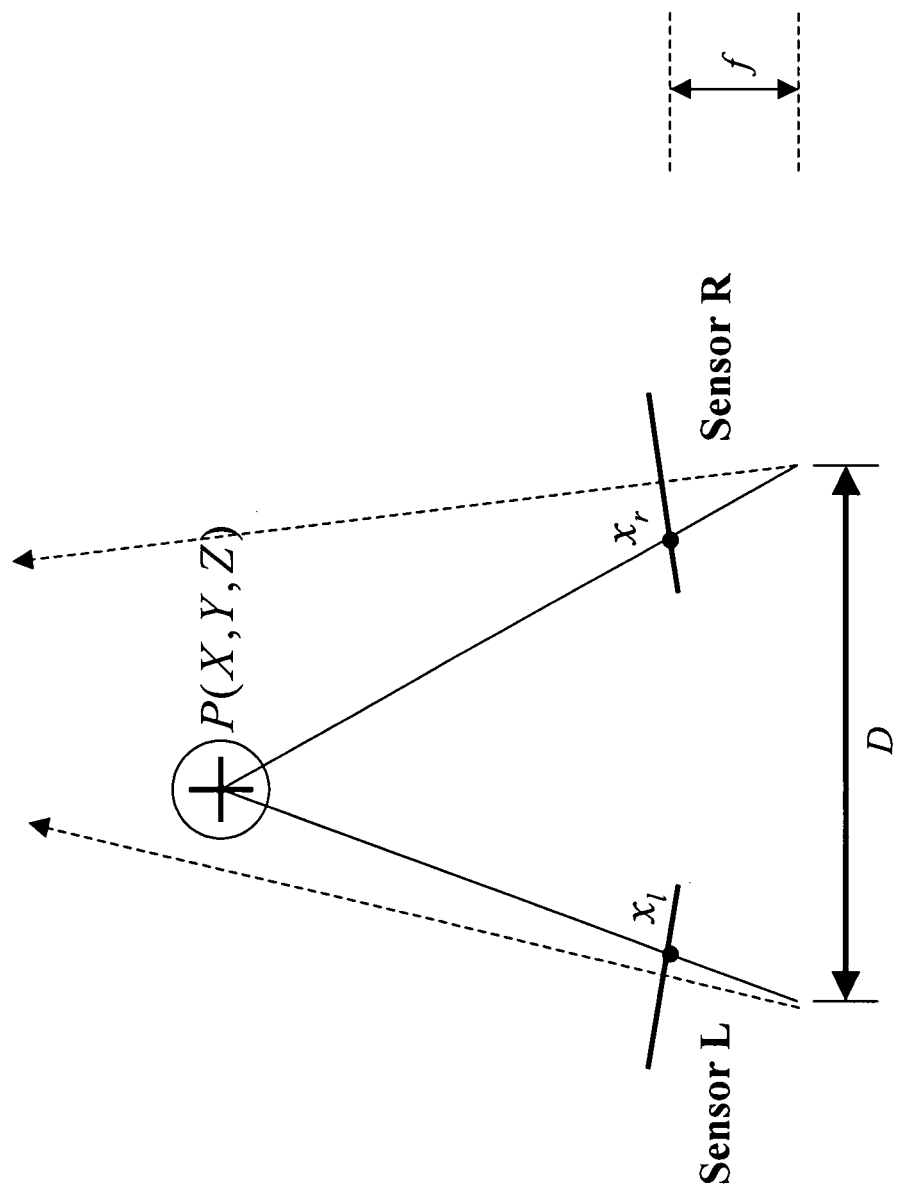

The left and right sensors are arranged in the same plane in the situation shown in FIG. 4A, but it does not have to be so. As shown in FIG. 4B, if the two sensors are not in the same plane, that is, there is a relative angle between them, the present invention can still calculate the 3D information of an object according to the interior parameters, relative angle, and relative distance of the sensors. The details for such calculation are already known by one skilled in this art; as an example, please refer to pp. 460-469, "Image Processing, Analysis, and Machine Vision", second edition, by Sonka, Hlavac, and Boyleand, published by Brooks/Cole Publishing Company.

If, for speeding up calculation, not all of the object information is kept but only the feature of an object is extracted, the present invention can still restore the 3D information for the whole object according to the feature and predetermined transformation rules, as will be further explained according to FIG. 4C. The restored 3D information does not have to be exactly the same as the original 3D information, because it is often not necessary to know the exact information of the object in actual application. For example, very likely it is only required to know the displacement of the object between two time points, and for this application, it is not necessary to know the exact shape of the object. As shown in FIG. 4C, assuming the extracted feature is two turn points of an object, the 3D information of the object can be restored according to predetermined transformation rules such as aspect ratio and shape, based on the 3D coordinates of these points.

After obtaining the 3D information of the object, preferably, the present invention marks the 3D object in step S24 (which is, giving a feature code or an ID code), to simplify the memory and calculation loading of the system.

Referring to FIG. 3, at time point Tn after T1, the 2D objects in the information obtained by the left and right sensors are as shown in the lower part of the figure. After correspondences are established (5 to 7, 6 to 8 correspondences), similarly, the 3D information of the objects can be calculated, and they are marked. It is further checked and found that the 3D object information obtained by the 5 to 7 correspondence is most similar to the 3D object information previously obtained by the 1 to 3 correspondence. Thus, a 3D displacement between them can be calculated, and the interactive system can generate a response according to the displacement.

Figure 5A:
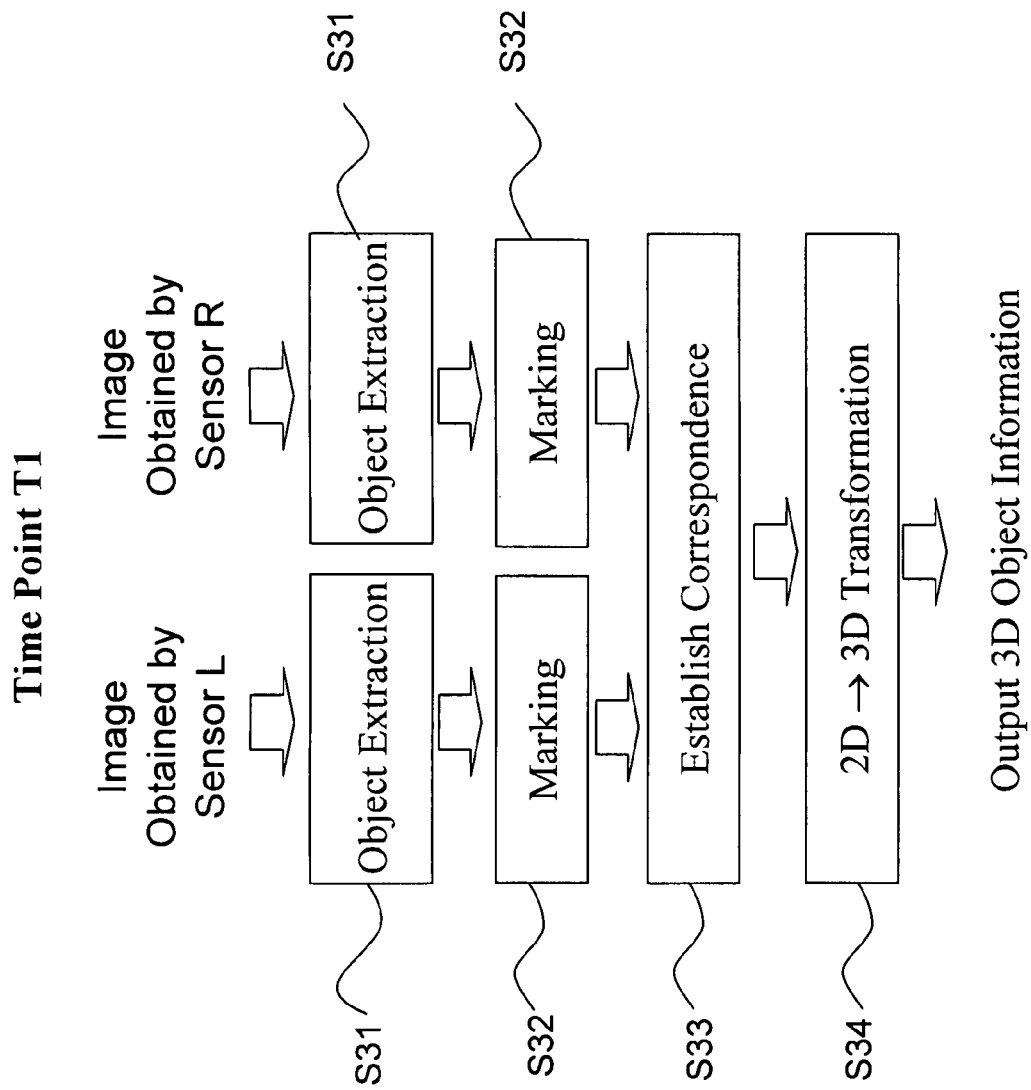
FIGS. 5A and 5B show another method embodiment according to the present invention.
Figure 5B:
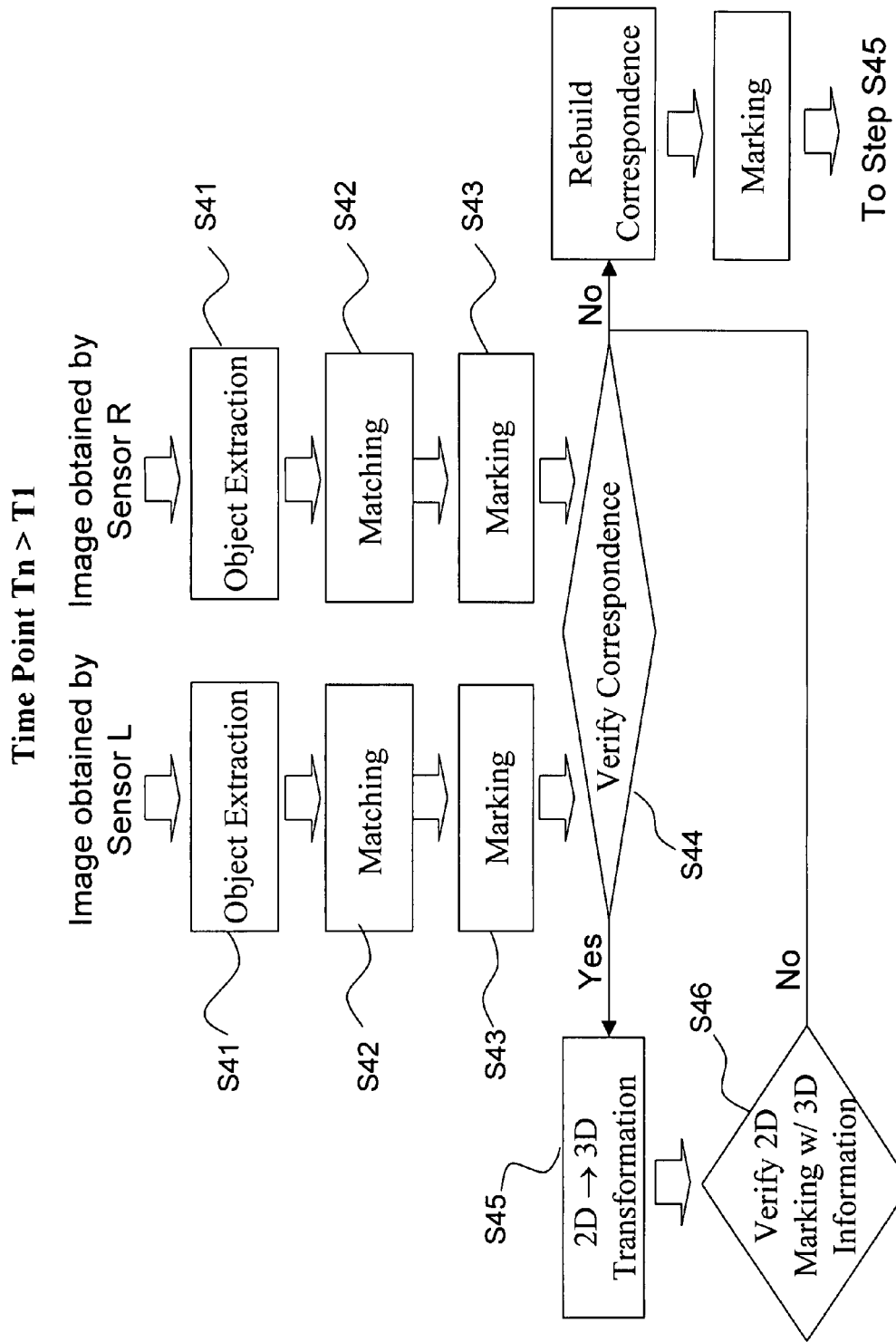
Figure 6:
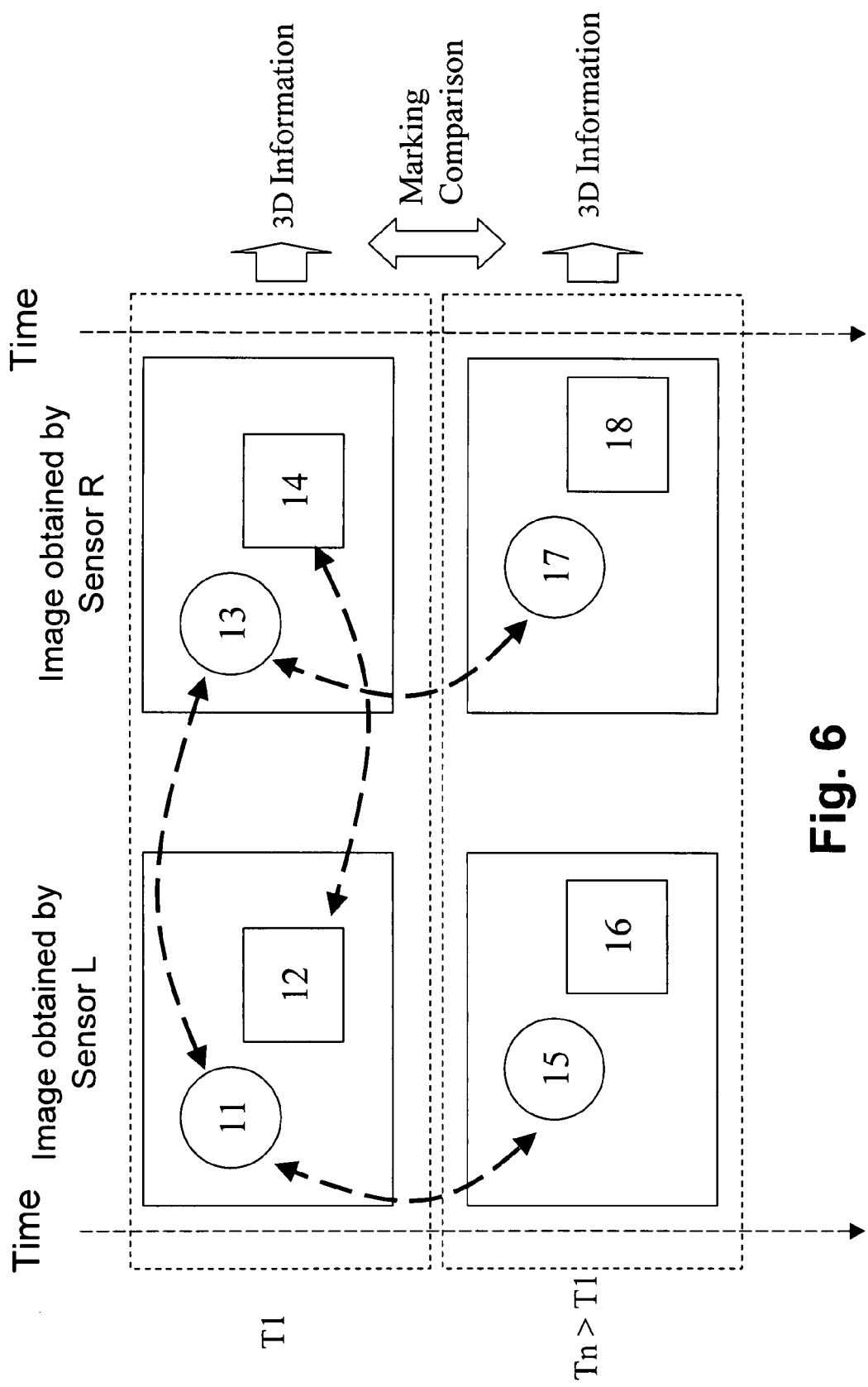
FIG. 6 shows an example for establishing correspondences between objects in time and space domains, after objects having been extracted.

FIGS. 5A, 5B and 6 show another method embodiment according to the present invention. Referring to FIG. 5A, which shows the steps at the time point T1. This embodiment is different from the previous embodiment in that, after the step S31 of object extraction, the marking step (step S32) is taken first. Correspondences are built after marking, that is, correspondences between objects 11 and 13, and 12 and 14 in FIG. 6, are established in step S33. Thereafter, step S34 is taken to generate 3D information based on the 2D information of the corresponding objects. But no marking is required after generation of 3D information.

Referring to FIG. 5B, which shows the steps at a time point Tn after T1. After the step S41 of object extraction, the system matches the extracted 2D objects with the marked objects at the time point T1, to establish relationships between the objects (step S42). That is, the correspondences between objects 11 and 15, and 13 and 17 in FIG. 6, in time domain, are established. Because there is correspondence between the objects 11 and 13, the correspondence between the objects 15 and 17 can be obtained by logic operation, without matching calculation; this reduces the calculation time and loading for hardware. Thereafter in the step S43, the 2D objects are marked. After marking, 3D information is generated according to the 2D information of the corresponding objects (step S45). According to the present invention, either before or after step S45, a step of S44 or S46 can be taken (either one or both taken, or both omitted), to verify the correspondences between the objects.

Figure 7:
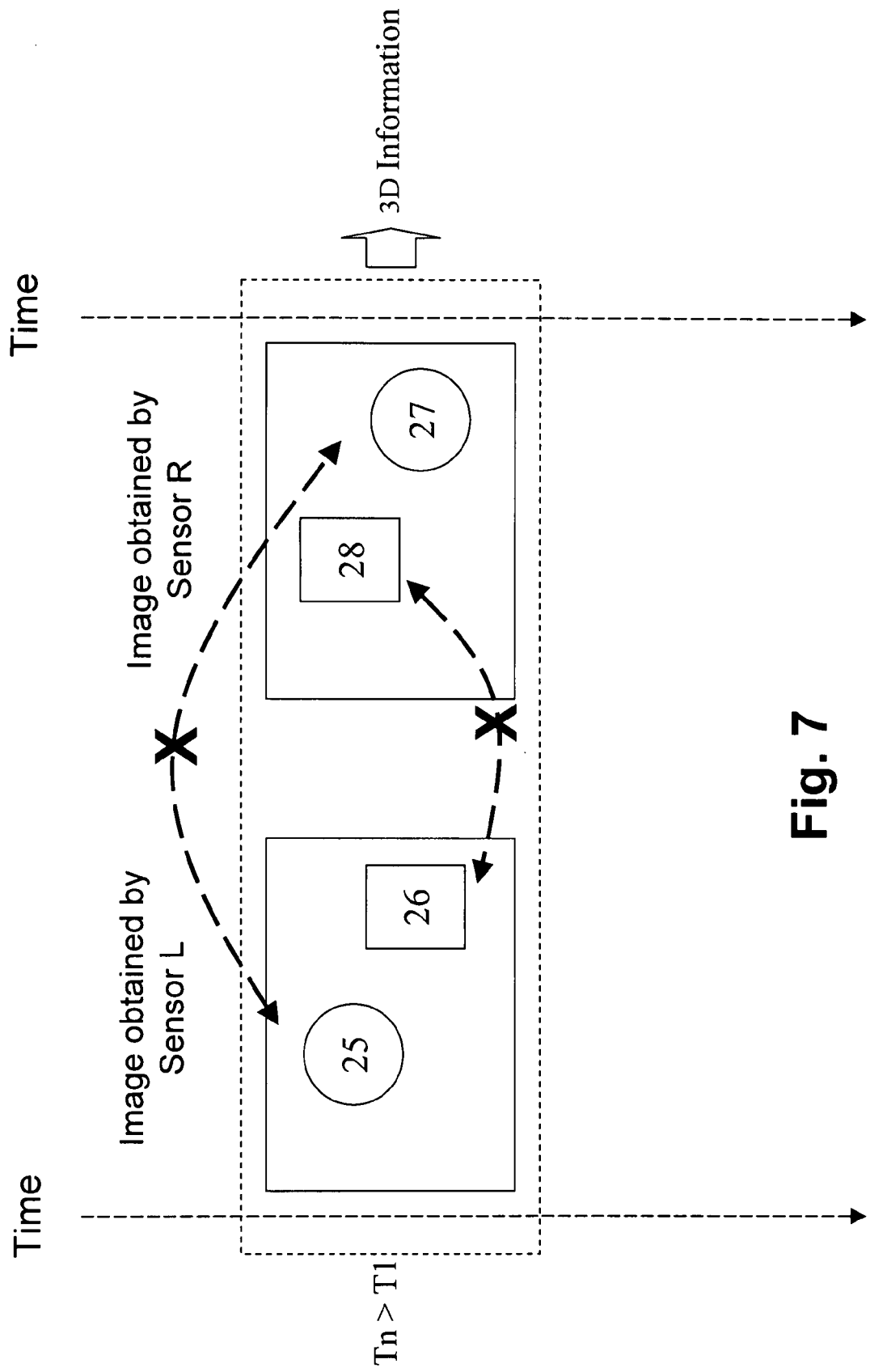
FIG. 7 shows an example of misjudgment of correspondences.

One possible situation where verification is required, is as follows. As shown in FIG. 7, assuming the correspondences between the objects are built based on the shapes of the objects, the 2D objects 25 and 26 are, respectively, the 2D images of two 3D physical cylinders; the object 25 is a top view while the object 28 is a side view of the same first cylinder, and the object 26 is a side view while the object 27 is a top view of the same second cylinder. Because of the view angle of the sensors and the spatial movement of the physical objects, the objects 25 and 27 are similar, and the objects 26 and 28 are similar, at the time point Tn. The system could misjudge the correspondences and determine that the object 25 corresponds to the object 27, and the object 26 corresponds to the object 28. Note that if only one cylinder rotates but not the other, it is unlikely to misjudge because the system can select the closest correspondence in multiple combinations of correspondences (the closest one is the one with lowest total difference). It is only when the movement of two physical objects coincidentally switches the established correspondence that the confusion could happen.

Although such misjudgment rarely happens, according to the present invention, it can be prevented by verifying the correspondences between the 2D objects before the step S45. As an example, the system can calculate the gravity center of each object, and verify whether the corresponding objects have closest gravity centers. In the example of FIG. 7, when superimposing the 2D images obtained by the two sensors, the objects 25 and 28 have closest gravity centers, and the objects 26 and 27 have closest gravity centers. Hence, the system can rebuild the correspondences between the objects, according to the result of verification. After rebuilding the correspondences, the system gives new markings.

The verification step can be performed based on methods other than checking the closeness of the gravity centers. For example, the system can check whether the overlapping area of two corresponding objects is the largest among many possible correspondence relationships. Or, if the correspondence is not established by shapes, the verification step can be performed based on shapes.

As an alternative to the verification step S44, the system can check whether mark given to the 2D object is the same as the 3D object (step S46), after 3D information is generated. If not, a correspondence is rebuilt, and the 3D information is re-generated. Either the step 44 or the step 46 is sufficient to avoid misjudgment, but of course, the system can take both.

FIGS. 8A and 8B show two hardware embodiments of circuits capable of implementing the foregoing methods. Referring to FIG. 8A, the images obtained by the left and right sensors 81L and 81R are sent to object extraction circuits 82L and 82R respectively (the object extraction circuits may be, e.g., circuits to analyze brightness). Object information generated by the object extraction circuits 82L and 82R are sent to corresponding processors 83L and 83R respectively. The processors may be any circuit capable of data calculation, such as CPUs, MCUs, DSPs, ASICs, etc. Each of the sensors, the object extraction circuits, and the processors can be a stand-alone IC (integrated circuit), or as shown in the figure, a sensor and an object extraction circuit can be integrated into an IC (the ICs 80L and 80R), and the processors are each a stand-alone IC. In the arrangement of FIG. 8A, one of the two processors, e.g., 83L, transmits its calculated 2D data to the other processor (83R), and the latter makes calculation based on corresponding 2D data to generate 3D information. The 3D information is outputted via an output interface 86.

FIG. 8B shows another hardware embodiment wherein the extracted 2D object information is sent to the same processor 84, which generates 3D information and outputs it via the output interface 86.

As seen from the foregoing, in comparison with prior art, the present invention does not need to predefine the shape of a physical object, and the physical object does not have to include two parts of high color contrast. In addition, there is an important advantage of the present invention, as seen from the hardware structure described above. Between the processors 83L and 83R in FIG. 8A, or between the circuits 80L and 80R and the processor 84 in FIG. 8B, it is only required to transmit small amount of data for the object information, or even smaller amount of data for the extracted feature information (instead of complicated information of pixels of the whole image), the communication interface between the circuits requires only a very low bandwidth, while the processing speed is very high. As an example, under the circumstance where the frame rate is 200 F/sec, the object information in each frame is less than 100 byte/sec, and thus the required bandwidth is as low as 20 Kbyte/sec. Moreover, in the most preferred arrangement according to the present invention wherein IR light emission source is used, objects are extracted by brightness, calculation is based on gravity centers, and markings are taken, the hardware loading can be reduced to minimum; not only the loading of the communication interface, but also that of the processor, can be reduced to minimum. Hence, as stated above, the processor does not have to be a high level CPU, MUC, or DSP, but instead can be a low cost ASIC. The communication interface described above is not shown in the figures; it can be provided between the two processors 83L and 83R as a stand-alone device in FIG. 8A, or integrated in one or both of the processors 83L and 83R, or between the circuits 80L and 80R and the processor 84 as a stand-alone device in FIG. 8B, or integrated in the processor 84.

Figure 9:
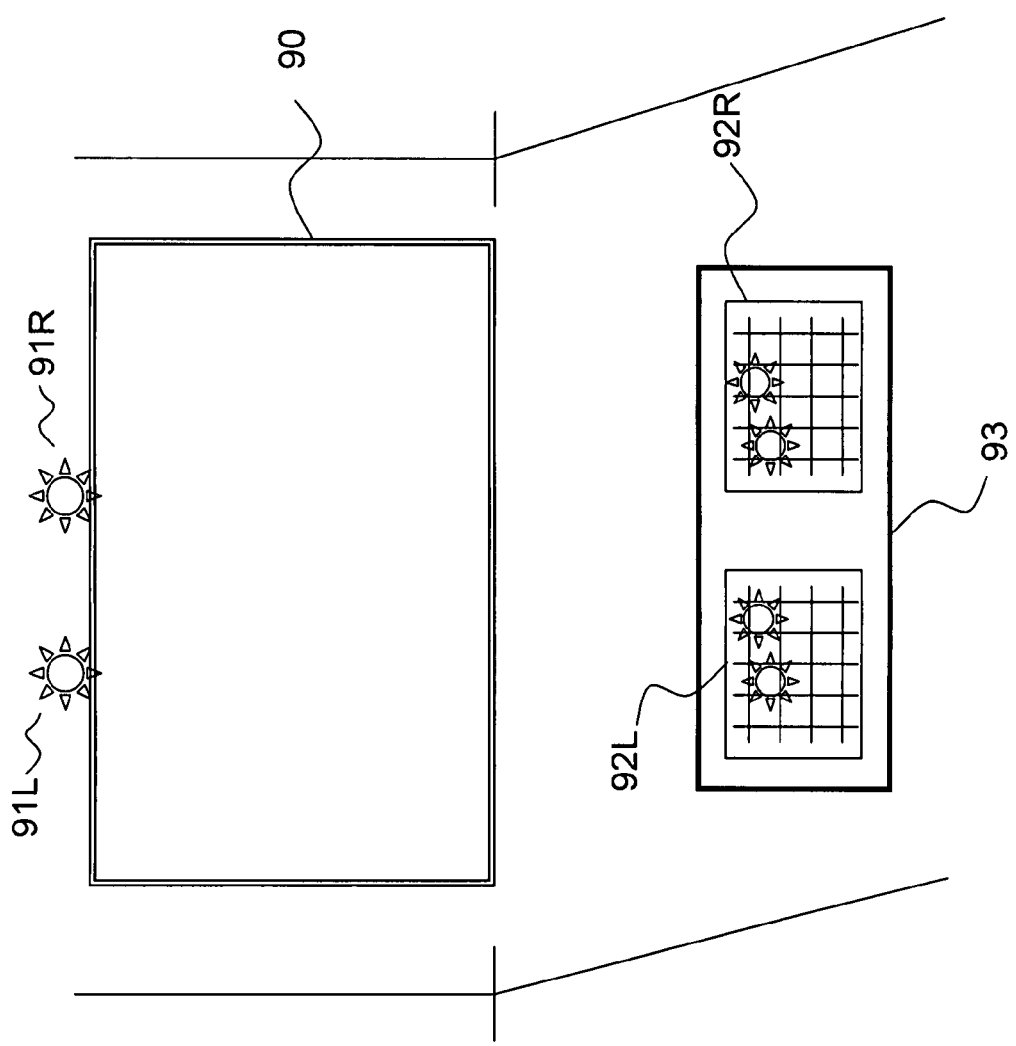
FIGS. 9-11 show three embodiments of interactive systems using the method/circuit according to the present invention.
Figure 10:
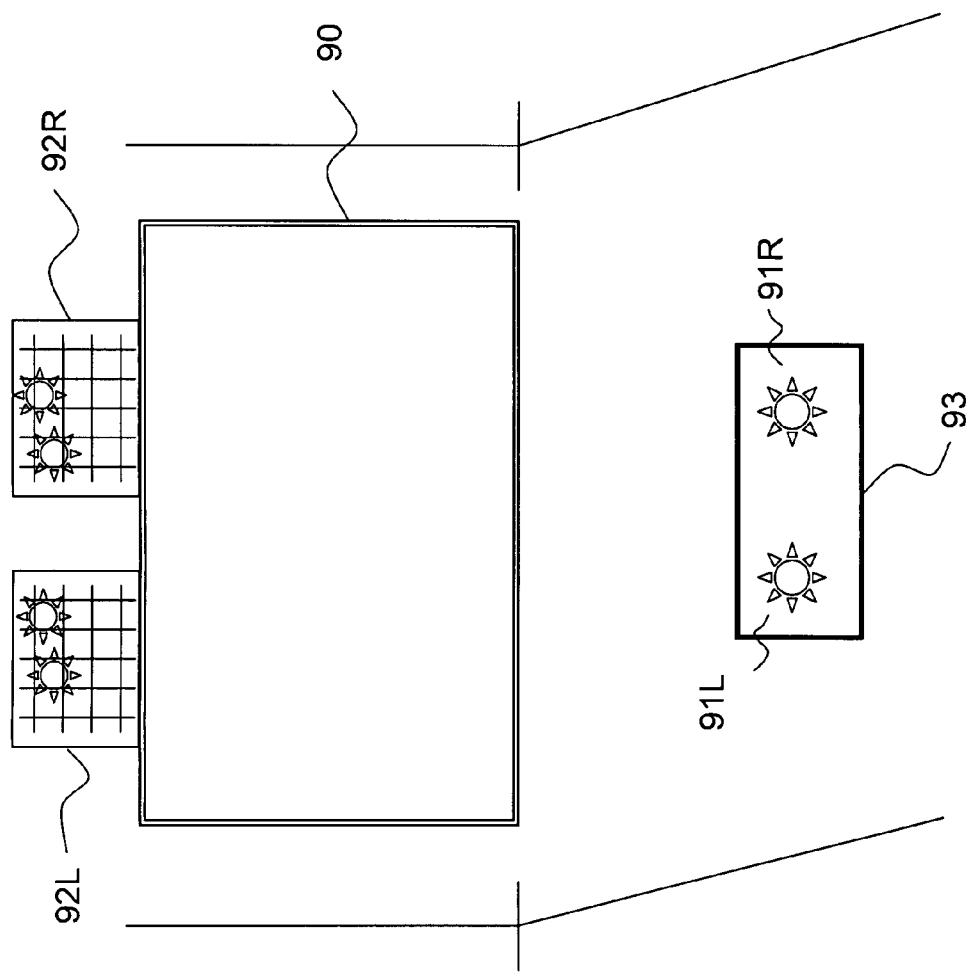
Figure 11:
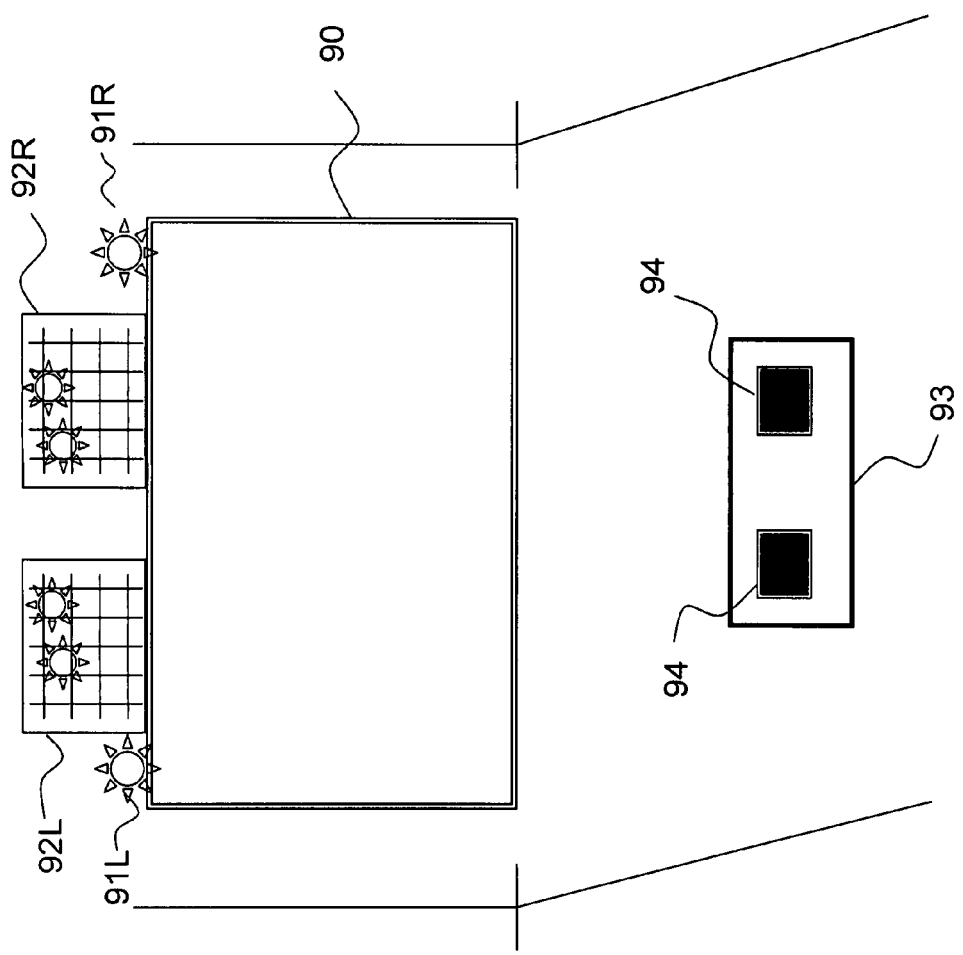

FIGS. 9-11 show several embodiments of interactive systems using the methods and/or circuits of the present invention. In FIG. 9, light emission sources 91L and 91R are located at the side of the monitor 90, and the sensors 92L and 92R are located at the side of hand-held controller 93. (The light emission source is preferably an IR light emission source, same below. The figure shows two light emission sources, which is only an illustrative example; the minimum number of light emission source is one.) In FIG. 10, light emission sources 91L and 91R are located at the side of the hand-held controller 93, and the sensors 92L and 92R are located at the side of the monitor 90. In the above two arrangements, the light emission source and the sensors are located at two sides of a space. In FIG. 11, both the light emission sources 91L and 91R and the sensors 92L and 92R are located at the side of the monitor 90, and the hand-held controller 93 is provided with light-reflective blocks 94 made of a light-reflective material. The number of light-reflective blocks 94 can be either number (one or more), with any arbitrary shape. The arrangement of FIG. 11 provides an advantage that the hand-held controller 93 does not require any electric power, better than prior art.

The interactive system of the present invention can be used in the following applications: as a platform for electronic games; as a 3D indexing apparatus, such as an input device for portable electronics such as PDAs, cell phones, notebook computers; as an apparatus for tracing 3D displacements of a physical object; and so on.

The features, characteristics and effects of the present invention have been described with reference to its preferred embodiments, for illustrating the spirit of the invention rather than limiting the scope of the invention. Various other substitutions and modifications will occur to those skilled in the art, without departing from the spirit of the present invention. For example, in all the embodiments, two sensors are used; of course, it also works to use three or more sensors. The two sensors are located left and right, but can instead be located up and down. The purpose of the sensors is to sense images; they can be replaced by any other devices that can capture images. Each of the circuits shown in one circuit block does not have to be a single IC; it can be integrated with other blocks—for instance, in addition to what have been described in the hardware embodiment, the output interface and the processor can be integrated together; or even, all the sensor, the object extraction circuit, the processor and the output interface are integrated into one IC. The monitor 90 can be a TV screen, or a dedicated screen for games. Thus, all such substitutions and modifications are intended to be embraced within the scope of the invention as defined in the appended claims.

What is claimed is:

1. An object-based 3-dimensional (3D) stereo information generation method, comprising:
    obtaining at least two 2-dimensional (2D) images from the same area at a first time point;
    extracting information of a plurality of first non-physical objects from the at least two 2D images, wherein each of the first non-physical objects is a group of pixels having a similar characteristic appearing in the images;
    establishing a correspondence between at least two of the first objects;
    verifying the correspondence, wherein the verifying step includes one or more of the following: checking the closeness of the gravity centers of the corresponding objects; checking whether the overlapping area of the corresponding objects is the largest; checking where the number of laterals of the corresponding objects is the closest; and combinations of one or more of the above;
    generating 3D information according to the at least two first objects with correspondence; and
    marking a first 3D non-physical object in the 3D information to give the first 3D non physical object an identity (ID) which does not change when a coordinate of the first 3D non-physical object changes.

2. The method according to claim 1, further comprising:
    obtaining at least two other 2D images from the same area at a second time point;
    extracting information of a plurality of second non-physical objects from the at least two other 2D images;
    establishing a correspondence between at least two of the second non-physical objects;
    verifying the correspondence, wherein the verifying step includes one or more of the following: checking the closeness of the gravity centers of the corresponding objects; checking whether the overlapping area of the corresponding objects is the largest; checking where the number of laterals of the corresponding objects is the closest; and combinations of one or more of the above;
    generating 3D information according to the at least two second objects with correspondence;
    marking a second 3D non-physical object in the 3D information to give the second 3D non-physical object an identity (ID) which does not change when a coordinate of the first 3D non-physical object changes; and determining a displacement by comparing the 3D information at the first time point and that at the second time point.

3. The method according to claim 2, wherein the step of determining a displacement is to compare the marked 3D non-physical objects.

4. The method according to claim 1, further comprising: after extracting information of a plurality of first non-physical objects from the at least two 2D images, marking the first non-physical objects to give each first non-physical object an identity (ID) which does not change when a coordinate of the corresponding first non-physical object changes.

5. The method according to claim 4, further comprising:
obtaining at least two other 2D images from the same area at a second time point;
extracting information of a plurality of second non-physical objects from the at least two other 2D images;
establishing a correspondence between the first and the second non-physical objects and marking the second non-physical objects accordingly; and
generating 3D information according to the non-physical objects with correspondence.

6. The method according to claim 5, further comprising: determining a displacement by comparing the 3D information at the first time point and that at the second time point.

7. The method according to claim 5, further comprising: after establishing the correspondence, verifying the correspondence.

8. An object-based 3-dimensional (3D) stereo information generation method, comprising:
obtaining at least two 2-dimensional (2D) infrared images from the same area at a first time point;
extracting information of a plurality of first objects from the at least two 20 infrared images, wherein each of the first objects is a group of pixels having a similar characteristic appearing in the infrared images;
establishing a correspondence between at least two of the first objects;
generating first 3D information according to the at least two first objects with correspondence, wherein the first 3D information includes a first 3D object formed according to the at least two first objects with correspondence;
marking the first 3D object to give the first 3D object an identity (ID) which does not change when a coordinate of the first 3D object changes;
obtaining at least two other 2D infrared images from the same area at a second time point;
extracting information of a plurality of second objects from the at least two other 2D infrared images;
establishing a correspondence between at least two of the second objects;
generating second 3D information according to the at least two second objects with correspondence; and
verifying whether the second 3D information includes a second 3D object that matches with the marked first 3D object.

9. The method according to claim 8, further comprising: determining a displacement by comparing the first and second 3D information.

10. The method according to claim 8,
further comprising: after establishing the correspondence between the at least two first objects, or after establishing the correspondence between the at least two second objects, verifying the correspondence, wherein the verifying step includes one or more of the following: checking the closeness of the gravity centers of the corresponding objects; checking whether the overlapping area of the corresponding objects is the largest; checking where the number of laterals of the corresponding objects is the closest; and combinations of one or more of the above.

11. The method according to claim 10, further comprising: when the verifying step verifies that the established correspondence is incorrect, rebuilding the correspondence.

12. The method according to claim 11, further comprising: after rebuilding the correspondence, giving a new marking to the second 3D object.

13. An object-based 3-dimensional (3D) stereo information generation method, comprising:
obtaining at least two 2-dimensional (2D) infrared images from the same area at a first time point;
extracting information of a plurality of first objects from the at least two 2D infrared images, wherein each of the first objects is a group of pixels having a similar characteristic appearing in the infrared images;
marking the first objects to give each first object an identity (ID) which does not change when a coordinate of the corresponding first object changes;
establishing a correspondence between at least two of the first objects;
generating first 3D information according to the at least two first objects with correspondence;
obtaining at least two other 2D infrared images from the same area at a second time point;
extracting information of a plurality of second objects from the at least two other 2D infrared images;
establishing correspondences between the second objects and the marked first objects, and marking the second objects accordingly;
establishing a correspondence between at least two of the second objects;
generating second 3D information according to the two second objects with correspondence.

14. The method according to claim 13, further comprising: determining a displacement by comparing the first and second 3D information.

15. The method according to claim 13, further comprising; after establishing the correspondences between the second objects and the marked first objects, or after establishing a correspondence between the at least two second objects, verifying the correspondences or correspondence, wherein the verifying step includes one or more of the following: checking the closeness of the gravity centers of the corresponding objects; checking whether the overlapping area of the corresponding objects is the largest; checking where the number of laterals of the corresponding objects is the closest; and combinations of one or more of the above.

16. The method according to claim 15, further comprising: when the verifying step verifies that the established correspondence is incorrect, rebuilding the correspondence.

17. The method according to claim 16, further comprising: after rebuilding the correspondence, marking the second object to give the second object a new ID.

18. An object-based 3-dimensional (3D) stereo information generation method, comprising:
obtaining at least two 2-dimensional (2D) infrared images from the same area at a first time point;
extracting information of a plurality of first objects from the at least two 2D infrared images, wherein each of the first objects is a group of pixels having a similar characteristic appearing in the infrared images;

marking the first objects to give each first object an identity (ID);
establishing a correspondence between at least two of the first objects;
generating first 3D information according to the at least two first objects with correspondence;
obtaining at least two other 2D infrared images from the same area at a second time point;
extracting information of a plurality of second objects from the at least two other 2D infrared images;
establishing correspondences between the second objects and the marked first objects, and marking the second objects accordingly;
establishing a correspondence between at least two of the second objects;
generating second 3D information according to the two second objects with correspondence;
after generating the second 3D information, verifying whether a 3D object in the second 3D information corresponds to the marked second objects.

* * * * *